(12) United States Patent
Brederlow et al.

(10) Patent No.: US 10,837,845 B2
(45) Date of Patent: Nov. 17, 2020

(54) DETECTION OF STRAIN DIRECTION IN AN INTEGRATED CIRCUIT

(71) Applicant: TEXAS INSTRUMENTS INCORPORATED, Dallas, TX (US)

(72) Inventors: Ralf Peter Brederlow, Poing (DE); Steven Bartling, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 141 days.

(21) Appl. No.: 16/227,133

(22) Filed: Dec. 20, 2018

(65) Prior Publication Data
US 2020/0200618 A1    Jun. 25, 2020

(51) Int. Cl.
*G01L 1/22*    (2006.01)

(52) U.S. Cl.
CPC ................................ *G01L 1/225* (2013.01)

(58) Field of Classification Search
CPC ...................................................... G01L 1/225
USPC ............................................................ 73/587
See application file for complete search history.

(56) References Cited

U.S. PATENT DOCUMENTS

| | | | | |
|---|---|---|---|---|
| 10,266,394 | B2* | 4/2019 | Hoekstra | B81B 7/0061 |
| 10,352,792 | B2* | 7/2019 | Nurmetov | H01L 27/22 |
| 2016/0277844 | A1* | 9/2016 | Kopetz | H04R 19/005 |
| 2017/0217762 | A1* | 8/2017 | Hoekstra | H04R 19/005 |
| 2017/0374442 | A1* | 12/2017 | Pennock | H04R 19/005 |

FOREIGN PATENT DOCUMENTS

| | | | |
|---|---|---|---|
| GB | 2542979 | * | 4/2017 |
| GB | 2556263 | * | 5/2018 |

* cited by examiner

*Primary Examiner* — Jacques M Saint Surin
(74) *Attorney, Agent, or Firm* — Michael A. Davis, Jr.; Charles A. Brill; Frank D. Cimino

(57) ABSTRACT

Circuitry for determining the direction of incidence of an acoustic signal in an integrated circuit. An electronic circuit includes a packaged integrated circuit. The packaged integrated circuit includes a die. The die includes a plurality of acoustic transducers spaced apart on the die, and a measurement circuit. The plurality of acoustic transducers includes at least a first acoustic transducer and a second acoustic transducer. The measurement circuit is coupled to at least the first acoustic transducer and the second acoustic transducer. The measurement circuit is configured to determine for the first acoustic transducer, a first time at which the first acoustic transducer detects an acoustic signal propagating in the die; and determine for the second acoustic transducer, a second time at which the second acoustic transducer detects the acoustic signal propagating in the die.

20 Claims, 3 Drawing Sheets

DETECTION OF STRAIN DIRECTION IN AN INTEGRATED CIRCUIT

BACKGROUND

Strain and/or vibration information is useful in a wide variety of applications. For example, detected vibration can be an indicator of the operational health of a device. By analyzing vibration, the condition of the device can be determined, and steps taken as needed to maintain and/or repair the device. Strain and vibration can be detected using sensors such as strain gauges, micro-electro-mechanical systems (MEMS) accelerometers, piezoelectric sensors, optical sensors, and various other sensing technologies.

SUMMARY

Circuitry, including on-die sensors, for determining the direction of incidence of an acoustic signal in an integrated circuit are disclosed herein. In one example, an electronic circuit includes a packaged integrated circuit. The packaged integrated circuit includes a die. The die includes a plurality of acoustic transducers spaced apart on the die, and a measurement circuit. The plurality of acoustic transducers includes at least a first acoustic transducer and a second acoustic transducer. The measurement circuit is coupled to at least the first acoustic transducer and the second acoustic transducer. The measurement circuit is configured to determine for the first acoustic transducer, a first time at which the first acoustic transducer detects an acoustic signal propagating in the die; and determine for the second acoustic transducer, a second time at which the second acoustic transducer detects the acoustic signal propagating in the die.

In another example, a packaged integrated circuit includes a die. The die includes a plurality of acoustic transducers spaced apart on the die, and a measurement circuit. The plurality of acoustic transducers includes at least a first acoustic transducer and a second acoustic transducer. The measurement circuit is coupled to the acoustic transducers. The measurement circuit includes a plurality of comparators. The plurality of comparators including at least a first comparator and a second comparator. The first comparator includes a first input terminal coupled to the first acoustic transducer, and a second input terminal coupled to a threshold voltage generation circuit. The second comparator includes a first input terminal coupled to the second acoustic transducer, and a second input terminal coupled to the threshold voltage generation circuit.

In a further example, a packaged integrated circuit includes a die. The die includes a plurality of acoustic transducers spaced apart on the die, and a measurement circuit coupled to the plurality of acoustic transducers. The plurality of acoustic transducers includes at least a first acoustic transducer, a second acoustic transducer, and a third acoustic transducer. The measurement circuit includes a plurality of comparators, a plurality of timers, and computation circuitry. The plurality of comparators includes at least a first comparator, a second comparator, and a third comparator. The first comparator is coupled to the first acoustic transducer and is configured to compare an output of the first acoustic transducer to a threshold voltage. The second comparator is coupled to the second acoustic transducer and is configured to compare an output of the second acoustic transducer to the threshold voltage. The third comparator is coupled to the third acoustic transducer and is configured to compare an output of the third acoustic transducer to the threshold voltage. The plurality of timers includes at least a first timer, a second timer, and a third timer. The first timer is coupled to the first comparator and is configured to determine a first time value at which an output of the first comparator indicates that an output voltage generated by the first acoustic transducer crossed the threshold voltage. The second timer is coupled to the second comparator and is configured to determine a second time value at which an output of the second comparator indicates that an output voltage generated by the second acoustic transducer crossed the threshold voltage. The third timer is coupled to the third comparator and is configured to determine a third time value at which an output of the third comparator indicates that an output voltage generated by the third acoustic transducer crossed the threshold voltage. The computation circuitry is coupled to the timers and is configured to determine an angle of origin of the acoustic signal with respect to the die based on the first time value, the second time value, and the third time value.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

Micro-electro-mechanical systems (MEMS) accelerometers and gyroscopes are semiconductor based devices used for vibration detection. Fabrication of these devices requires specialized and expensive silicon manufacturing equipment. Embodiments of the present disclosure include acoustic transducers and measurement circuitry on an integrated circuit die using components available in complementary metal oxide semiconductor (CMOS) or ferroelectric random access memory (FRAM) technology for ease of manufacture. The measurement circuitry applies the output of the acoustic transducers to determine the direction of origin of an acoustic signal incident on the integrated circuit die. The direction of incidence of the acoustic signal can be used to identify the source of a vibration, and trigger equipment maintenance.

Figure 1:
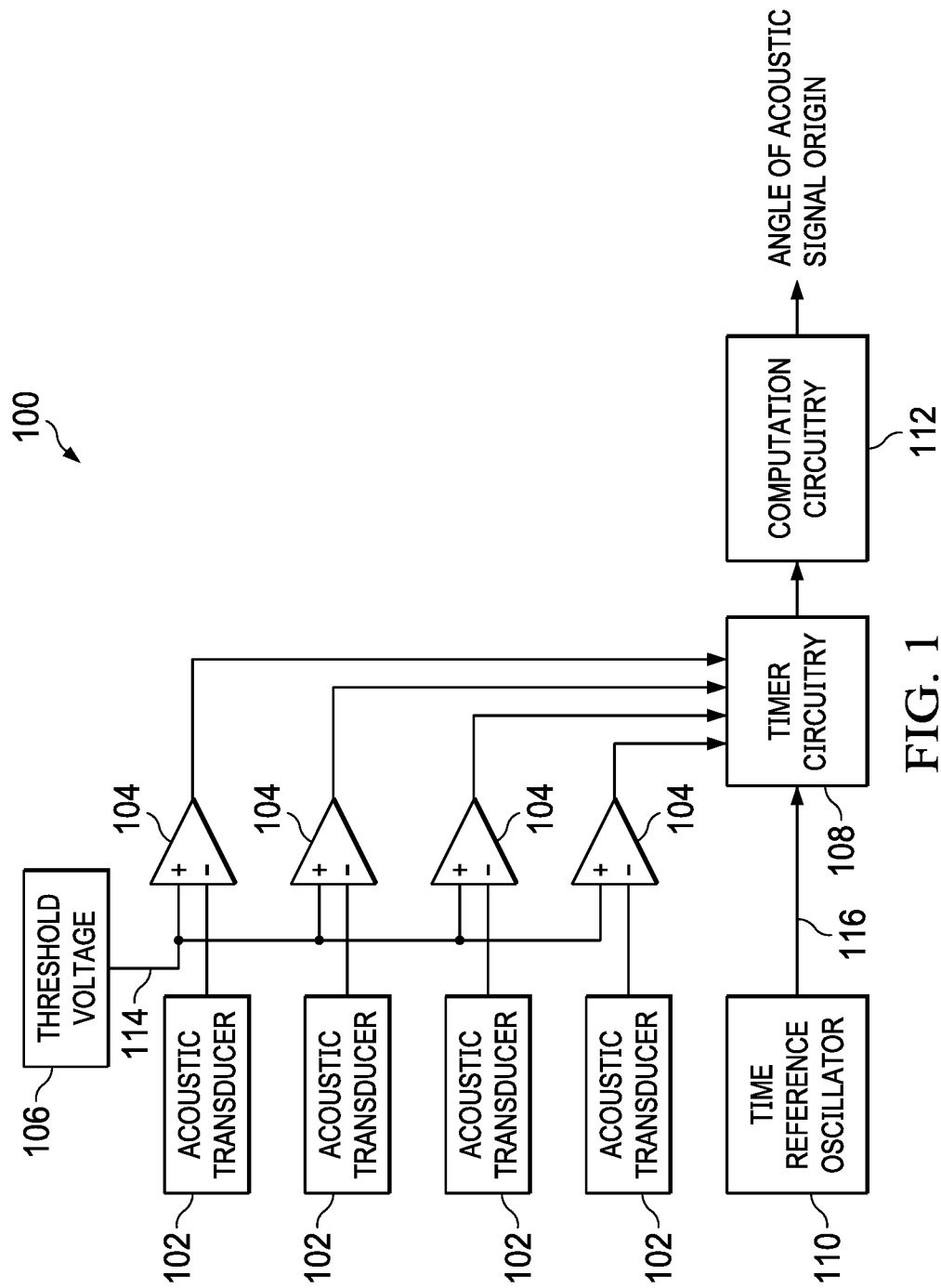
FIG. 1 shows a block diagram for an example of an integrated circuit that determines the direction of origin of an incident acoustic signal in accordance with the present disclosure.

FIG. 1 shows a block diagram for an example of circuitry of an integrated circuit that determines the direction of origin of an incident acoustic signal in accordance with the present disclosure. The circuitry 100 includes a plurality of acoustic transducers 102, a plurality of comparators 104, threshold voltage circuitry 106, timer circuitry 108, time reference circuitry 110, and computation circuitry 112. Each of the acoustic transducers 102 may be a stress sensitive resistor (e.g., a resistor having resistance that varies with the stress applied to the resistor), a piezoelectric device that generates a voltage or resistance change as a function of stress, or other device that exhibits a measurable change with stress. For example, if an acoustic signal produces stress on one the acoustic transducers 102, the output voltage generated by the acoustic transducers 102 may change (increase or decrease).

Each of the acoustic transducers 102 is coupled to one of the comparators 104. Each of the comparators 104 is also coupled the threshold voltage circuitry 106. The threshold voltage circuitry 106 generates a threshold voltage. For example, the threshold voltage circuitry 106 may include a reference voltage regulation circuit, a voltage divider, etc., to generate a threshold voltage 114. Each of the comparators 104 compares the output of the connected one acoustic transducers 102 to the threshold voltage 114. Thus, the output of a comparator 104 changes state if the output of the connected acoustic transducer 102 crosses the threshold voltage 114 (e.g., increases to a voltage greater than the threshold voltage 114 or decreases to a voltage less than the threshold voltage 114).

Each of the comparators 104 is coupled to the timer circuitry 108. The timer circuitry 108 includes circuitry to capture a time value at which the output of each of the comparators 104 changes state. In some implementations, the timer circuitry 108 includes a separate timer, for each comparator 104, that is halted when the output of the connected comparator 104 changes state. In some implementations, the timer circuitry 108 includes a single timer and a separate register for each comparator 104 that captures the output of the timer when the output of the connected comparator 104 changes state. The time reference circuitry 110 generates a clock signal that advances (increments) the timer(s) of the timer circuitry 108. The value captured by the timer circuitry 108 for each of the acoustic transducers 102 represents the time at which an acoustic signal is incident on the acoustic transducers 102. The time reference circuitry 110 may include a crystal oscillator, a phase-locked-loop, frequency dividers, and/or other clock generation circuitry to produce a reference clock signal 116 that is provided to the timer circuitry 108.

The time values captured by the timer circuitry 108 are provided to the computation circuitry 112. The computation circuitry 112 determines an angle, e.g., relative to the acoustic transducers 102, of origin of the acoustic signal detected by the acoustic transducers 102.

The computation circuitry 112 includes circuitry that determines the angle of origin of an acoustic signal incident upon the acoustic transducers 102. In some implementations, the computation circuitry 112 may include a processor, such as a microcontroller or general purpose microprocessor programmed to determine the angle of origin of the acoustic signal based on the time values captured by the timer circuitry 108.

The computation circuitry 112 may compute the angle to the origin of the acoustic signal based on the locations of the acoustic transducers 102 and the time values captured by the timer circuitry 108 as:

$$\alpha = \arcsin\left(\frac{(x_1 - x_2)}{v(t_1 - t_0)}\right)$$

where:
v is the velocity of sound in the integrated circuit die;
$t_0$ is the time at which the acoustic signal is detected at a first of the acoustic transducers 102;
$t_1$ is the time at which the acoustic signal is detected at a second of the acoustic transducers 102;
$x_1$ is a location of the first of the acoustic transducers 102 on the integrated circuit die;
$x_2$ is a location of the second of the acoustic transducers 102 on the integrated circuit die.

$$\alpha = \arccos\left(\frac{(y_1 - y_3)}{v(t_2 - t_0)}\right)$$

where:
$t_2$ is the time at which the acoustic signal is detected at a third of the acoustic transducers 102;
$y_1$ is a location of the first of the acoustic transducers 102 on the integrated circuit die;
$y_3$ is a location of the third of the acoustic transducers 102 on the integrated circuit die.

Figure 2:
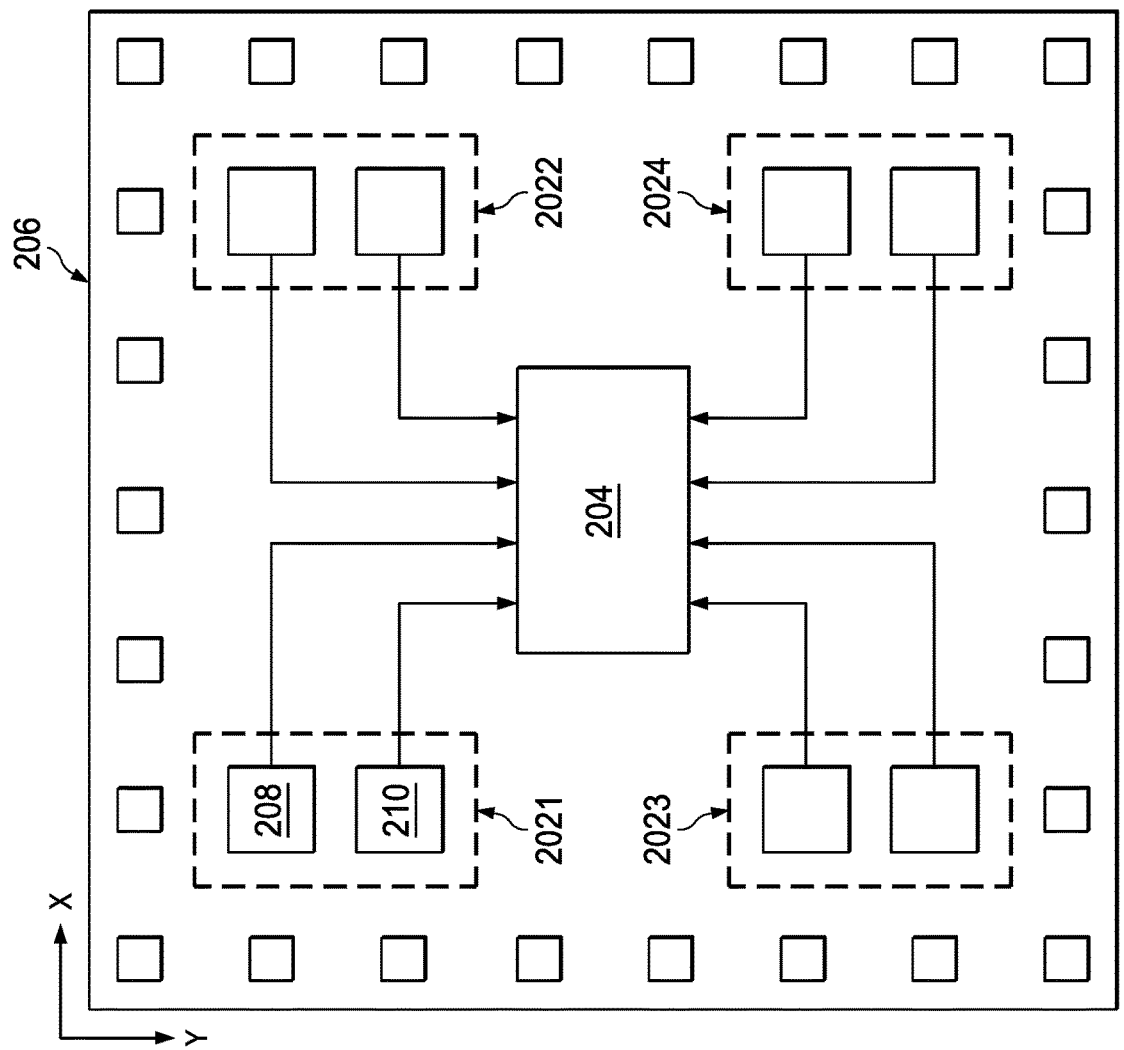
FIG. 2 shows an example of placement, on an integrated circuit die, of circuit components that determine the direction of origin of an incident acoustic signal in accordance with the present disclosure.

FIG. 2 shows an example of an integrated circuit die 206 that includes circuit components that determine the direction of origin of an incident acoustic signal in accordance with the present disclosure. The integrated circuit die 206 includes acoustic transducer 2021, acoustic transducer 2022, acoustic transducer 2023, and acoustic transducer 2034, and acoustic processing circuitry 204. Some implementations of the integrated circuit die 206 may include various other circuits that have been omitted from FIG. 2 in the interest of clarity.

The integrated circuit die 206 may be generally square or rectangular in shape, and one of the acoustic transducers 2021, 2022, 2023, and 2024 is disposed at each of the corners of the integrated circuit die 206. Various implementations of the integrated circuit die 206, include three or more acoustic transducers (e.g., some implementations include 3, 4, 6, 8, or more acoustic transducers). Accordingly, some implementations of the integrated circuit die 206 may not include the acoustic transducer 2024. Each of the acoustic transducers 2021, 2022, 2023, and 2024 may include a single omnidirectional sensor such as a piezoelectric capacitive strain sensor, or may include multiple directional acoustic sensor, such as piezoelectric resistive strain sensors. In FIG. 2, each of the acoustic transducers 2021, 2022, 2023, 2024 includes two acoustic sensors 208 and 210. The acoustic sensor 208 detects acoustic signals traveling in a first direction and the acoustic sensor 210 detects acoustic signals traveling in a second direction. For example, the acoustic sensor 208 may detect acoustic signals traveling in an X direction as shown in FIG. 2, and the acoustic sensor 210 may detect acoustic signals traveling in a Y direction as shown in FIG. 2. In other implementations, the acoustic sensor 208 and the acoustic sensor 210 may disposed to detect acoustic signals traveling in directions different from X and Y or non-directional as per the capacitive strain sensor shown in FIG. 2.

The acoustic processing circuitry 204 is coupled to each of the acoustic transducer 2021, the acoustic transducer 2022, the acoustic transducer 2023, and the acoustic transducer 2024. The acoustic processing circuitry 204 includes circuitry to determine an angle to the origin of an acoustic signal detected by the acoustic transducers 2021, 2022, 2023, and 2024. In some implementations, the acoustic processing circuitry 204 may include the comparators 104, the threshold voltage circuitry 106, the timer circuitry 108, the time reference circuitry 110, and the computation circuitry 112 shown in FIG. 1.

In order for the circuitry of the integrated circuit die 206 to accurately determine the direction of origin of an acoustic signal, the integrated circuit die 206 is coupled to a mounting substrate, such as a printed circuit board, in a manner that facilitates propagation of acoustic signal to the integrated circuit die 206.

Figure 3:
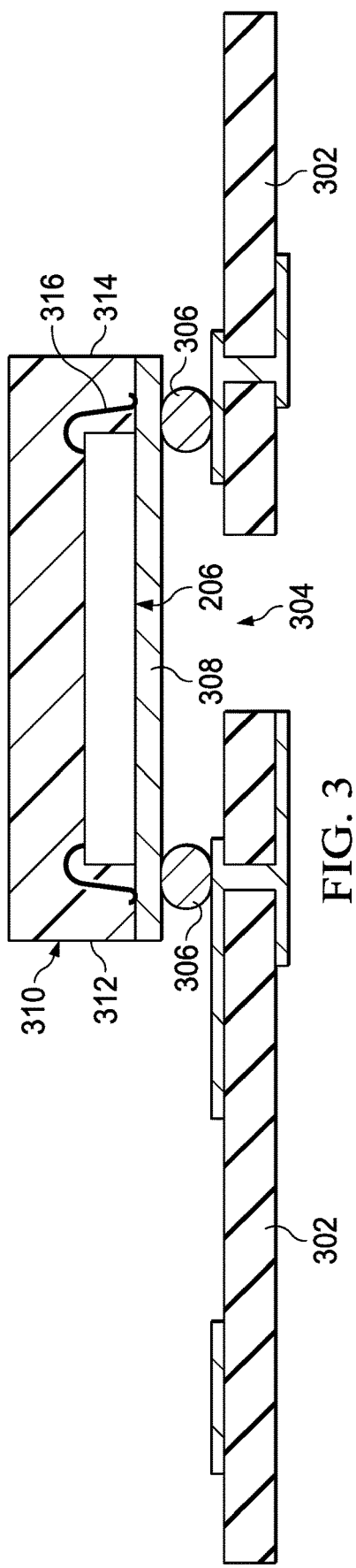
FIG. 3 shows a first example of a packaged integrated circuit that determines the direction of origin of an incident acoustic signal mounted on a substrate in accordance with the present disclosure.

FIG. 3 shows a first example of a packaged integrated circuit 310 that determines the direction of origin of an incident acoustic signal mounted on a substrate in accordance with the present disclosure. In FIG. 3, the packaged integrated circuit 310 includes the integrated circuit die 206. The integrated circuit die 206 is mounted on a lead frame 308, and electrically coupled to the lead frame 308 by the bond wires 316. The packaged integrated circuit 310 includes terminals 306 that electrically and mechanically couple the packaged integrated circuit 310 to a substrate 302. The terminals 306 may be, for example, pins, solder balls, solder columns, or various other types of integrated circuit package structures used to connect an integrated circuit package to a substrate. The substrate 302 may be a printed circuit board or other conductive medium to which packaged integrated circuits are mounted, and should be designed such that at the boundary of different materials (e.g., materials that propagate sound at different speeds) the acoustic energy transfer between the different materials is optimized.

To facilitate determination of the angle of origin of an acoustic signal, the packaged integrated circuit 310 includes terminals 306 disposed at a first end 312 of the packaged integrated circuit 310, and terminals 306 disposed at a second end 314 of the packaged integrated circuit 310. The first end 312 is opposite the second end 314. The terminals 306 are mechanically coupled to the substrate 302. The substrate 302 includes a gap 304 disposed beneath the packaged integrated circuit 310. The gap 304 inhibits propagation of an acoustic signal through the substrate 302 from the first end 312 to the second end 314 and vice versa. Accordingly, acoustic signal passing between the first end 312 and the second end 314 passes through, and is detected by, the circuitry 100 of the integrated circuit die 206.

Figure 4:
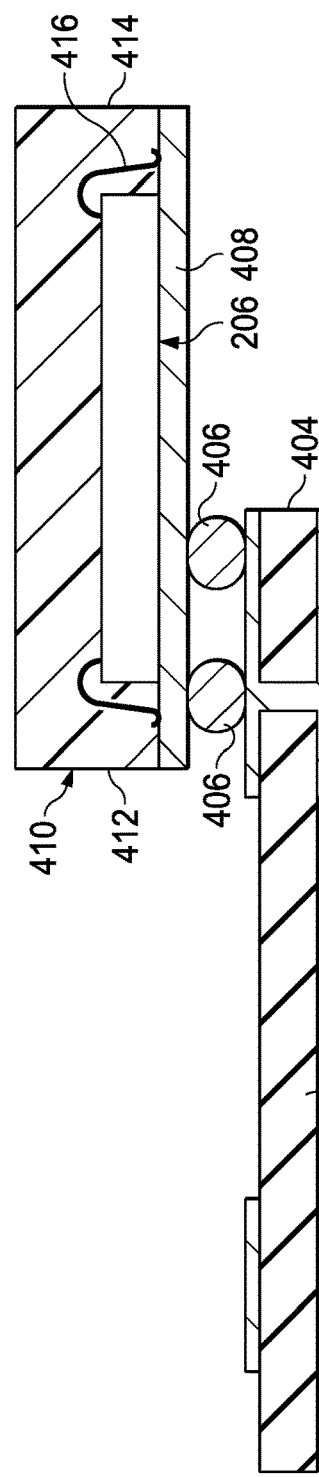
FIG. 4 shows a second example of a packaged integrated circuit that determines the direction of origin of an incident acoustic signal mounted on a substrate in accordance with the present disclosure.

FIG. 4 shows a second example of a packaged integrated circuit 410 that determines the direction of origin of an incident acoustic signal mounted on a substrate in accordance with the present disclosure. In FIG. 4, the packaged integrated circuit 410 includes the integrated circuit die 206. The integrated circuit die 206 is mounted on a lead frame 408, and both mechanically and electrically coupled to the lead frame 408 by the bond wires 416. The packaged integrated circuit 410 includes terminals 406 that electrically and mechanically couple the packaged integrated circuit 410 to a substrate 402. The terminals 406 may be, for example, pins, solder balls, solder columns, or various other types of integrated circuit package structures used to connect an integrated circuit package to a substrate. The substrate 402 may a printed circuit board or other conductive medium to which packaged integrated circuits are mounted.

To facilitate determination of the angle of origin of an acoustic signal, the packaged integrated circuit 410 includes terminals 406 disposed at a first end 412 of the packaged integrated circuit 410. The packaged integrated circuit 410 lacks terminals at the opposite end 414 of the packaged integrated circuit 410. The terminals 406 are mechanically coupled to the substrate 402. An end 404 of the substrate 402 is located underneath the packaged integrated circuit 410 to prevent propagation of acoustic energy around the packaged integrated circuit 410 through the substrate 410. Acoustic signal passing through the substrate 402 propagates into the packaged integrated circuit 410, and the integrated circuit die 206, via the terminals 406, and is detected by circuitry 100 of the integrated circuit die 206.

Modifications are possible in the described embodiments, and other embodiments are possible, within the scope of the claims.

What is claimed is:

1. An electronic circuit, comprising:
a packaged integrated circuit, comprising:
a die comprising:
a plurality of acoustic transducers spaced apart on the die, including at least a first acoustic transducer and a second acoustic transducer;
a measurement circuit coupled to at least the first acoustic transducer and the second acoustic transducer, the measurement circuit configured to:
determine for the first acoustic transducer, a first time at which the first acoustic transducer detects an acoustic signal propagating in the die; and
determine for the second acoustic transducer, a second time at which the second acoustic transducer detects the acoustic signal propagating in the die.

2. The electronic circuit of claim 1, wherein the measurement circuit comprises:
a first comparator, coupled to the first acoustic transducer, to compare an output of the first acoustic transducer to a threshold voltage; and
a second comparator, coupled to the second acoustic transducer, to compare an output of the second acoustic transducer to the threshold voltage.

3. The electronic circuit of claim 2, wherein the measurement circuit comprises:
a first timer, coupled to the first comparator, to determine a first time value at which an output of the first comparator indicates that the threshold voltage is crossed by a first acoustic transducer output signal; and
a second timer, coupled to the second comparator, to determine a second time value at which an output of the second comparator indicates that the threshold voltage is crossed by a second acoustic transducer output signal.

4. The electronic circuit of claim 3 wherein the measurement circuit comprises computation circuitry configured to determine an angle of origin of the acoustic signal with respect to the first acoustic transducer and the second acoustic transducer based on the first time value and the second time value.

5. The electronic circuit of claim 1, wherein the die comprises at least three of the acoustic transduces spaced apart on the die.

6. The electronic circuit of claim 1, further comprising:
a substrate to which the packaged integrated circuit is mounted;
wherein the packaged integrated circuit comprises:
a first end;
a second end opposite the first end;

terminals at the first end, the terminals configured to connect the packaged integrated circuit to the substrate;

terminals at the second end, the terminals configured to connect the packaged integrated circuit to the substrate;

wherein the substrate is configured to inhibit propagation of the acoustic signal between the first end and the second end.

7. The electronic circuit of claim 1, further comprising:
a substrate to which the packaged integrated circuit is mounted;
wherein the packaged integrated circuit comprises:
a first end;
a second end opposite the first end;
terminals at the first end, the terminals configured to connect the packaged integrated circuit to a substrate;
wherein the packaged integrated circuit is configured to be connected to the substrate only at the first end;
wherein the substrate terminates between the first end and the second end.

8. The electronic circuit of claim 1, wherein the acoustic transducers are stress sensitive resistors or piezoelectric devices.

9. The electronic circuit of claim 1, wherein the acoustic transducers are disposed at corners of the die.

10. A packaged integrated circuit, comprising:
a die, comprising:
a plurality of acoustic transducers spaced apart on the die, including at least a first acoustic transducer and a second acoustic transducer;
a measurement circuit coupled to the acoustic transducers, the measurement circuit comprising:
a plurality of comparators, including at least:
a first comparator comprising:
a first input terminal coupled to the first acoustic transducer; and
a second input terminal coupled to a threshold voltage generation circuit; and
a second comparator comprising:
a first input terminal coupled to the second acoustic transducer; and
a second input terminal coupled to the threshold voltage generation circuit.

11. The packaged integrated circuit of claim 10, wherein the measurement circuit comprises a plurality of timers including at least:
a first timer configured to determine a first time value at which an output of the first comparator indicates that an output voltage of the first acoustic transducer crosses a threshold voltage generated by the threshold voltage generation circuit; and
a second timer configured to determine a second time value at which an output of the second comparator indicates that an output voltage of the second acoustic transducer crosses the threshold voltage.

12. The packaged integrated circuit of claim 11, wherein the measurement circuit comprises a processor coupled to the timers, the processor configured to determine an angle of origin of an acoustic signal with respect to the die based on the first time value and the second time value.

13. The packaged integrated circuit of claim 10, wherein the die comprises at least three of the acoustic transducers spaced apart on the die.

14. The packaged integrated circuit of claim 10, wherein each of the acoustic transducers comprises:

a first acoustic sensor oriented to detect incidence of an acoustic signal from a first direction; and
a second acoustic sensor oriented to detect incidence of an acoustic signal from a second direction.

15. The packaged integrated circuit of claim 10, further comprising:
terminals to connect the packaged integrated circuit to a substrate;
wherein:
a first subset of the terminals is disposed at first end of the packaged integrated circuit; and
a remainder of the terminals is disposed at second end of the packaged integrated circuit, wherein the second end is opposite the first end.

16. The packaged integrated circuit of claim 10, further comprising terminals to connect the packaged integrated circuit to a substrate, wherein all of the terminals are disposed at one end of the packaged integrated circuit.

17. The packaged integrated circuit of claim 10, wherein each of the acoustic transducers is disposed at a different corner of the die.

18. The packaged integrated circuit of claim 10, wherein the acoustic transducers are stress sensitive resistors or piezoelectric devices.

19. A packaged integrated circuit, comprising:
a die, comprising:
a plurality of acoustic transducers spaced apart on the die, including at least a first acoustic transducer, a second acoustic transducer, and a third acoustic transducer;
a measurement circuit coupled to the acoustic transducers, the measurement circuit comprising:
a plurality of comparators including at least:
a first comparator coupled to the first acoustic transducer and configured to compare an output of the first acoustic transducer to a threshold voltage;
a second comparator coupled to the second acoustic transducer and configured to compare an output of the second acoustic transducer to the threshold voltage; and
a third comparator coupled to the third acoustic transducer and configured to compare an output of the third acoustic transducer to the threshold voltage;
a plurality of timers including at least:
a first timer coupled to the first comparator and configured to determine a first time value at which an output of the first comparator indicates that an output voltage generated by the first acoustic transducer crossed the threshold voltage;
a second timer coupled to the second comparator and configured to determine a second time value at which an output of the second comparator indicates that an output voltage generated by the second acoustic transducer crossed the threshold voltage; and
a third timer coupled to the third comparator and configured to determine a third time value at which an output of the third comparator indicates that an output voltage generated by the third acoustic transducer crossed the threshold voltage;
computation circuitry coupled to the timers and configured to determine an angle of origin of the acoustic signal with respect to the die based on the first time value, the second time value, and the third time value.

20. The packaged integrated circuit of claim 19, wherein the acoustic transducers are disposed at corners of the die.

\* \* \* \* \*